(12) United States Patent  
Bouzguarrou et al.

(10) Patent No.: US 11,080,184 B2  
(45) Date of Patent: Aug. 3, 2021

(54) CIRCUITRY AND METHOD

(71) Applicant: Arm Limited, Cambridge (GB)

(72) Inventors: Houdhaifa Bouzguarrou, Valbonne (FR); Guillaume Bolbenes, Antibes (FR); Eddy Lapeyre, Antibes (FR); Luc Orion, Mouans Sartoux (FR)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/654,256

(22) Filed: Oct. 16, 2019

(65) Prior Publication Data

US 2020/0133851 A1 Apr. 30, 2020

(30) Foreign Application Priority Data

Oct. 30, 2018 (GB) ...................................... 1817689

(51) Int. Cl.
*G06F 12/06* (2006.01)
*G06F 9/32* (2018.01)
*G06F 9/38* (2018.01)

(52) U.S. Cl.
CPC .......... *G06F 12/0646* (2013.01); *G06F 9/321* (2013.01); *G06F 9/3802* (2013.01); *G06F 2212/1008* (2013.01)

(58) Field of Classification Search
None
See application file for complete search history.

(56) References Cited

U.S. PATENT DOCUMENTS

| 5,630,097 A | 5/1997 | Orbits et al. |
| 5,752,261 A | 5/1998 | Cochcroft, Jr. |
| 5,860,095 A | 1/1999 | Iacobovici et al. |

(Continued)

OTHER PUBLICATIONS

Combined Search and Examination Report for GB1817689.1 dated May 3, 2019, 7 pages.
Evtyij Shkin et al., "BranchScope: A New Side-Channel Attack on Directional Branch Predictor", ASPLOS'18, Mar. 24-28, 2018, pp. 693-707.

(Continued)

*Primary Examiner* — Yaima Rigol
(74) *Attorney, Agent, or Firm* — Nixon & Vanderhye, P.C.

(57) ABSTRACT

Circuitry comprises memory circuitry providing a plurality of memory locations;
location selection circuitry to select a set of one or more of the memory locations by which to access a data item according to a mapping relationship between an attribute of the data item and the set of one or more memory locations; the location selection circuitry being configured to initiate an allocation operation for a data item when that data item is to be newly stored by the memory circuitry and the selected set of one or more of the memory locations are already occupied by one or more other data items, the allocation operation comprising an operation to replace at least a subset of the one or more other data items from the set of one or more memory locations by the newly stored data item; and detector circuitry to detect a data access conflict in which a group of two or more data items having different respective attributes are mapped by the mapping relationship to the same set of one or more memory locations; the location selection circuitry being configured to vary the mapping relationship applicable to the attribute of at least one data item of the group of two or more data items in response to a detection by the detector circuitry of a data access conflict.

11 Claims, 5 Drawing Sheets

(56) References Cited

U.S. PATENT DOCUMENTS

| | | | |
|---|---|---|---|
| 9,842,051 B1* | 12/2017 | Schuttenberg | G06F 12/0833 |
| 2003/0070045 A1 | 4/2003 | Dwyer et al. | |
| 2009/0106506 A1 | 4/2009 | Skerlj et al. | |
| 2009/0210685 A1* | 8/2009 | Mouton | G06F 9/3844 |
| | | | 712/239 |
| 2011/0213923 A1* | 9/2011 | Ledford | G06F 12/0862 |
| | | | 711/113 |
| 2014/0025881 A1 | 1/2014 | Joshi et al. | |
| 2016/0342508 A1* | 11/2016 | Lesartre | G06F 12/023 |
| 2017/0153894 A1* | 6/2017 | Hornung | G06F 9/3848 |
| 2017/0315921 A1 | 11/2017 | Hooker et al. | |
| 2018/0285267 A1* | 10/2018 | Sasanka | G06F 12/0811 |
| 2019/0138315 A1 | 5/2019 | Bolbenes et al. | |

OTHER PUBLICATIONS

Wikipedia entry, "Branch Predictor", last edited Sep. 10, 2018, 10 pages.

\* cited by examiner

CIRCUITRY AND METHOD

This application claims priority to GB Patent Application No. 1817689.1 filed Oct. 30, 2018, the entire contents of which are hereby incorporated by reference.

BACKGROUND

This disclosure relates to circuitry and methods.

In some data processing applications, so-called branch prediction is used to predict instances of non-linear program flow, such as the outcome (branch taken or branch not taken) from conditional program flow branching instructions.

In some examples, the branch prediction process runs ahead of the execution of the instructions to provide the instructions speculatively in time to avoid so-called starvation (which would occur if insufficient instructions (that were next to be executed) were fetched in time for execution.

In order to predict the presence of a branch into a given program code portion, a historical data store such as a so-called branch target buffer (BTB) can provide an indication of previously taken branches at particular program counter (PC) values. For example, an attribute of the data item representing the previously taken branch, such as the PC value or part of it, can be used as the basis of a mapping between the data item and a storage location in the BTB.

SUMMARY

In an example arrangement there is provided circuitry comprising:

memory circuitry providing a plurality of memory locations;

location selection circuitry to select a set of one or more of the memory locations by which to access a data item according to a mapping relationship between an attribute of the data item and the set of one or more memory locations;

the location selection circuitry being configured to initiate an allocation operation for a data item when that data item is to be newly stored by the memory circuitry and the selected set of one or more of the memory locations are already occupied by one or more other data items, the allocation operation comprising an operation to replace at least a subset of the one or more other data items from the set of one or more memory locations by the newly stored data item; and detector circuitry to detect a data access conflict in which a group of two or more data items having different respective attributes are mapped by the mapping relationship to the same set of one or more memory locations;

the location selection circuitry being configured to vary the mapping relationship applicable to the attribute of at least one data item of the group of two or more data items in response to a detection by the detector circuitry of a data access conflict.

In another example arrangement there is provided a cache memory comprising circuitry as defined above; in which:

the data items represent versions of the contents of a higher level memory at a respective memory address; and the attribute for a data item is dependent at least in part on the memory address of that data item.

In another example arrangement there is provided a data processor comprising:

a processing element to execute data processing instructions; and fetch circuitry to fetch instructions for execution, defined by entries in a fetch queue; and prediction circuitry to generate entries for the fetch queue defining one or more next data processing instructions to be fetched;

the prediction circuitry comprising circuitry as defined above, the circuitry providing branch target storage to store one or more data items each comprising at least part of a program counter value and information defining a respective branch target address for a previously taken branch instruction, in which the attribute of a data item is dependent at least upon the program counter value.

In another example arrangement there is provided circuitry comprising:

memory means providing a plurality of memory locations;

means for selecting a set of one or more of the memory locations by which to access a data item according to a mapping relationship between an attribute of the data item and the set of one or more memory locations;

the means for selecting being operable to initiate an allocation operation for a data item when that data item is to be newly stored by the memory circuitry and the selected set of one or more of the memory locations are already occupied by one or more other data items, the allocation operation comprising an operation to replace at least a subset of the one or more other data items from the set of one or more memory locations by the newly stored data item; and means for detecting a data access conflict in which a group of two or more data items having different respective attributes are mapped by the mapping relationship to the same set of one or more memory locations;

the means for selecting being operable to vary the mapping relationship applicable to the attribute of at least one data item of the group of two or more data items in response to a detection of a data access conflict by the means for detecting.

In another example arrangement there is provided a method comprising:

selecting, from a plurality of memory locations, a set of one or more of the memory locations by which to access a data item according to a mapping relationship between an attribute of the data item and the set of one or more memory locations;

initiating an allocation operation for a data item when that data item is to be newly stored by the memory circuitry and the selected set of one or more of the memory locations are already occupied by one or more other data items, the allocation operation comprising an operation to replace at least a subset of the one or more other data items from the set of one or more memory locations by the newly stored data item;

detecting a data access conflict in which a group of two or more data items having different respective attributes are mapped by the mapping relationship to the same set of one or more memory locations; and varying the mapping relationship applicable to the attribute of at least one data item of the group of two or more data items in response to a detection of a data access conflict.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

Figure 1:
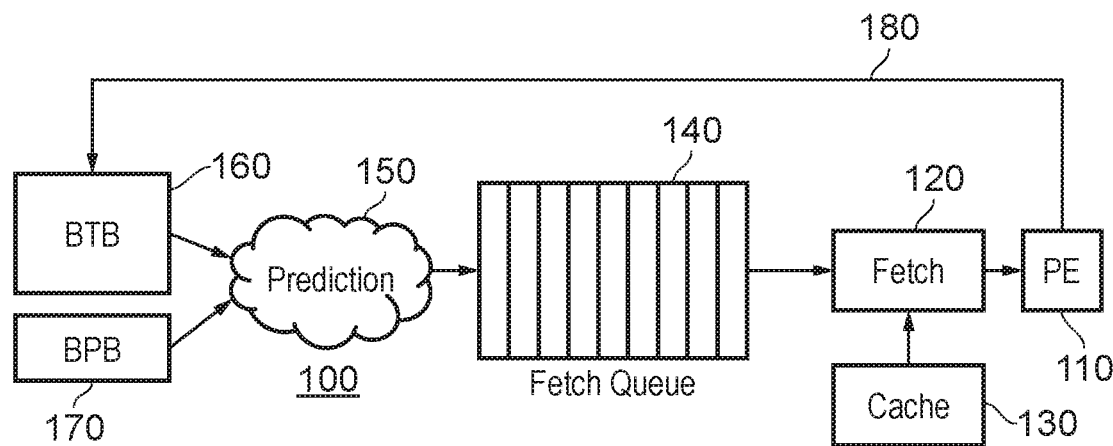
FIG. 1 schematically illustrates an example of data processing circuitry.

FIG. 1 is a schematic example of data processing circuitry 100 comprising a processing element (PE) 110 to execute program code instructions, fetch circuitry 120 to fetch blocks, containing instruction for execution, from memory and/or a cache 130 such as an instruction cache. The blocks to be fetched are defined by a fetch queue 140. The data processing circuitry also comprises prediction circuitry 150 to predict one or more next blocks to be fetched and to add the predicted next blocks to the fetch queue 140 as fetch queue entries.

The prediction circuitry 150 makes reference to branch target storage including at least a branch target buffer (BTB) 160 and to a branch prediction buffer (BPB) 170. These are drawn separately for clarity of the diagram but may be considered part of the prediction circuitry 150. The BTB 160 provides information which associates program counter (PC) values of an instruction to be executed with an associated branch target in the case that the instruction is a branch instruction. The BPB 170 stores historical data about the outcome (branch taken or branch not taken) of previous instances of the branch instructions, the historical data allowing the prediction circuitry 150 to arrive at a prediction of whether a particular branch instruction indicated by the BTB 160 will be taken or not taken.

Various mechanisms may be used by the prediction circuitry 150 to predict the "taken" or "not taken" status for an expected branch instruction. An example of such a technique is provided in U.S. Ser. No. 15/806,605 and https://en.wikipedia.org/wiki/Branch_predictor, the contents of each of which are hereby incorporated by reference. The prediction circuitry 150 uses such a technique to predict blocks (or portions, or granules, or even in an extreme example individual instructions) of program code to be fetched and adds data identifying such blocks to the fetch queue 140, on a first-in, first-out basis. The fetch circuitry 120 retrieves such data from the fetch queue 140 on the same basis (which is to say, the fetch circuitry 120 retrieves the least-recently-added entry or entries in the fetch queue 140) and initiates fetching of the blocks indicated by those entries. The required blocks may be in the cache 130 or may need to be retrieved from a main memory or higher level cache (not shown in FIG. 1).

In due course, the processing element 110 executes the fetched blocks of program code. Generally speaking, the system aims to fetch program code in advance of its execution, so that processing is not itself held up by a lack of code to be executed. So in this regard the fetching is speculative and is based purely on predictions made by the prediction circuitry. The predictions of branch outcomes will be proved to be either correct or incorrect when the relevant branch instruction is finally executed or resolved. If a prediction is incorrect, it may be that the wrong branch target code has been fetched (or code at a branch target has been fetched but the branch, when resolved, was not in fact taken) and the fetch and execution pipelines have to be flushed, incurring a delay while the correct blocks of program code are fetched for execution.

The processing element can provide information 180 back to the BTB 160 and BPB 170 relating to branch instructions actually encountered during execution, as well as their actual outcome. Where a branch instruction is encountered during execution (at least for a branch instruction where the branch is actually taken, though possibly for all branch instructions), information can be stored in the BTB 160 relating to the target of that branch instruction. Information relating to the outcome of the branch instruction (taken/not taken) can also be stored in the BPB 170.

FIG. 1 therefore provides an example of a data processor 100 having a processing element 110 to execute data processing instructions; fetch circuitry 120 to fetch instructions (for example, individual instructions or blocks, granules or the like containing instructions) for execution, defined by entries in a fetch queue 140; and prediction circuitry 150, 160, 170 to generate entries for the fetch queue defining one or more next data processing instructions to be fetched; the prediction circuitry comprising circuitry as defined below, in which in at least some examples the circuitry provides branch target storage to store one or more data items each comprising at least part of a program counter value and information defining a respective branch target address for a previously taken branch instruction, in which the attribute of a data item is dependent at least upon the program counter value.

Figure 2:
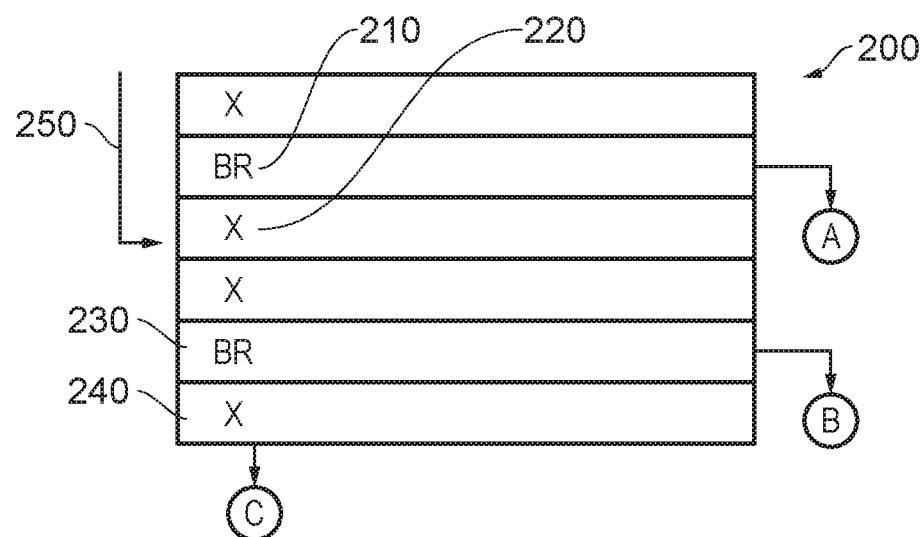
FIG. 2 schematically illustrates a series of data processing instructions.

FIG. 2 schematically illustrates a series of data processing instructions forming an example of a program code block, portion or granule 200. In the schematic representation of FIG. 2, six instructions are illustrated, but in example embodiments of the present disclosure the blocks of instructions may have a consistent base length (in bytes), being for example a power of two or at least a multiple of two, and are address-aligned in memory to positions representing multiples of the base length. For example, each portion may have a base length of 16 bytes and the portions may be aligned to 16 byte boundaries in memory.

In FIG. 2, the successive instructions are indicated as either "X" or "BR". The "X" instructions are non-branching instructions and are represented in this schematic manner to indicate that it is irrelevant to the present discussion what type of instruction they are. The "BR" instructions are conditionally branching instructions which can lead to a non-linear change in program flow depending on one or more parameters on the basis of which branch decision is taken.

Referring to a first example branch instruction 210, if the branch represented by this instruction is taken, then program flow is diverted to another program counter value A. If not, program flow continues to the next sequential instruction 220. Similarly, if the branch at a branch instruction 230 is taken, program flow is diverted to a program counter value B, but if not, flow continues to the next sequential instruction 240. Therefore, as a result of execution of the portion 200, program flow can:

redirect to the program counter value A;

redirect to the program counter value B; or continue to the next-in-order program counter value C (in a next granule, not shown).

Note that branch targets or destinations do not have to be aligned with the beginning of a portion such as the portion 200. In fact, a branch from elsewhere may enter the portion 200 at any instruction position, for example at the instruction 220 for an incoming branch 250.

Figure 3:
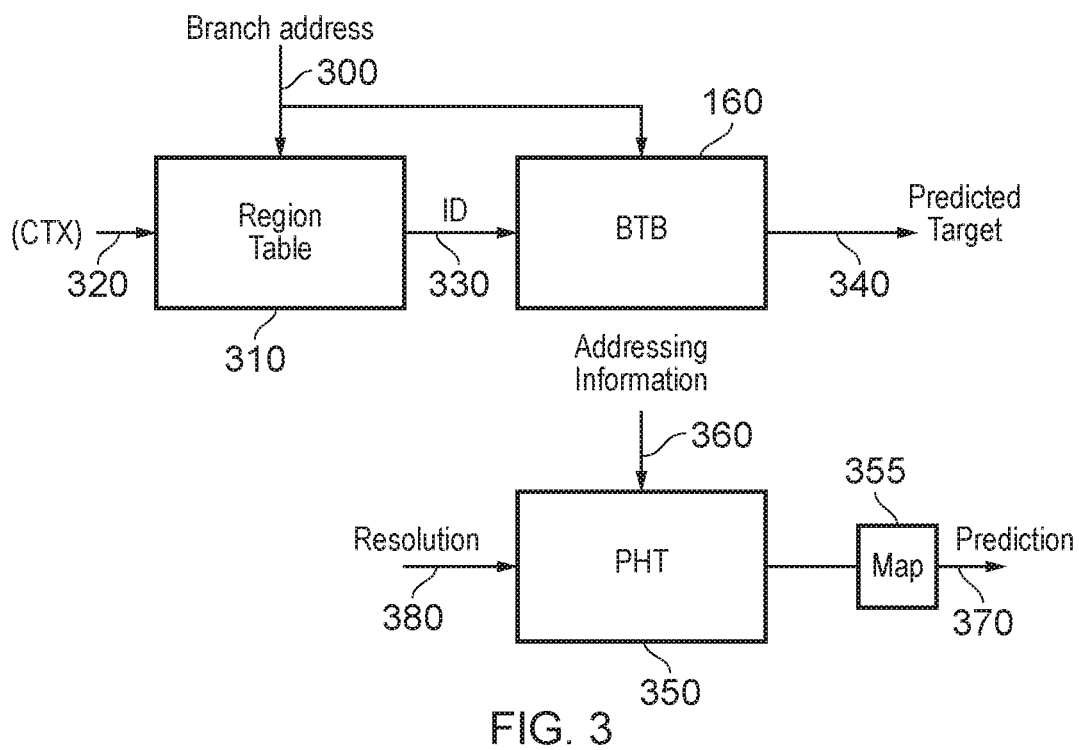
FIG. 3 schematically illustrates prediction circuitry.

FIG. 3 schematically illustrates an example of the operation of the prediction circuitry 150 including the functionality of the BTB 160 and the BPB 170.

Regarding the BTB 160, this receives a branch address 300 or program counter (PC) value, for example being the next PC value in the sequence described with reference to FIG. 2. A region table 310 maps the branch address, and in some examples a processor context 320 onto an identification (ID) value 330, for example by providing a mapping between memory page identifiers or sets of most significant bits (MSBs) of the branch address and ID values. So, to retrieve an ID value, the region table makes use of a subset of the branch address 300.

Note that the use of a region table is optional in the present techniques. If a region table or a similar function is used, then an attribute of a data item (from which a storage location is mapped—see below) can be for example an ID value derived from the region table and/or one or more LSBs of the data item address (such as a branch address). However, if a region table is not used, then once again the LSBs could be used as the attribute, with (for example) the MSBs being stored in the BTB for example as part of a tag, or alternatively the MSBs could be disregarded in a situation of partial tagging. The examples below should therefore be considered in the light of the optional nature of the region table and its generation of an ID value. Whichever information is used as the basis of mapping to a storage location is considered as the attribute of the data item in question.

The BTB 160 also makes use of a subset of the branch address, in this example a set of least significant bits (LSBs) and contains multiple entries each mapping a permutation of (ID, set of LSBs) to a predicted branch target address 340.

The BTB 160 will output the predicted branch target address 340 in any instance where there is an appropriate entry within the BTB 160, which is to say that the outputting of the predicted branch target address 340 by the BTB 160 is, in at least this example, independent of a prediction (to be discussed below) of whether the relevant branch will actually be taken.

Regarding the prediction of whether the branch is actually taken, various techniques are available such as one shown by way of example in FIG. 3 which involves the use of a so-called pattern history table (PHT) 350, forming at least a part of the BPB 170 mentioned above.

The PHT 350 provides a so-called adaptive branch prediction in which the recent history of whether a branch was taken or not taken is used to select a respective version of prediction information stored by the PHT 350 for the current branch instruction.

For example, to provide a prediction, a two-bit saturating counter may be used, representing a state machine with four states:

| | |
|---|---|
| 00 | Strongly not taken |
| 01 | Not taken |
| 10 | Taken |
| 11 | Strongly taken |

Here, the term "strongly" simply indicates that with the saturating counter scheme, it will take two successive instances of that prediction being incorrect in order to change the prediction represented by the saturating counter (so, to move from 00, strongly not taken, to 10, taken, requires two successive increments of the saturating counter before the actual prediction represented by the state of the saturating counter changes from a prediction of "not taken" to a prediction of "taken".

The saturating counter is updated in response to the actual resolution of a branch instruction. If the resolution of a relevant branch instruction is "taken" then the saturating counter is incremented, subject to saturation at the value 11. If the resolution of the relevant branch instruction is "not taken" then the saturating counter is decremented, subject to saturation at the value 00.

In terms of its adaptive operation, the PHT 350 stores (and selects from, for a given branch instruction) a plurality of entries each representing, for example, a two-bit saturating counter of the type described above. The PHT 350 accesses a relevant entry according to addressing information 360 to be discussed below and provides that counter value to mapping circuitry 355 which applies the mapping given in the table above to output a prediction 370 of "taken" (for a counter value of 10 or 11) or "not taken" (for a counter value of 00 or 01) depending on the contents of the addressed PHT entry.

When the resolution of that branch instruction is determined, the resolution is communicated 380 to the PHT 350 (as shown schematically as the information 180 in FIG. 1) and the relevant saturating counter is addressed once again and updated by an increment or a decrement depending on whether or not the branch was taken. In this way, the prediction circuitry is configured to modify the stored prediction data in dependence upon a resolution of whether the branch represented by the given branch instruction (relevance to the stored entry) is taken or not.

As mentioned above, the PHT 350 provides a plurality of entries and an individual entry is selected according to the addressing information 360.

Figure 4:
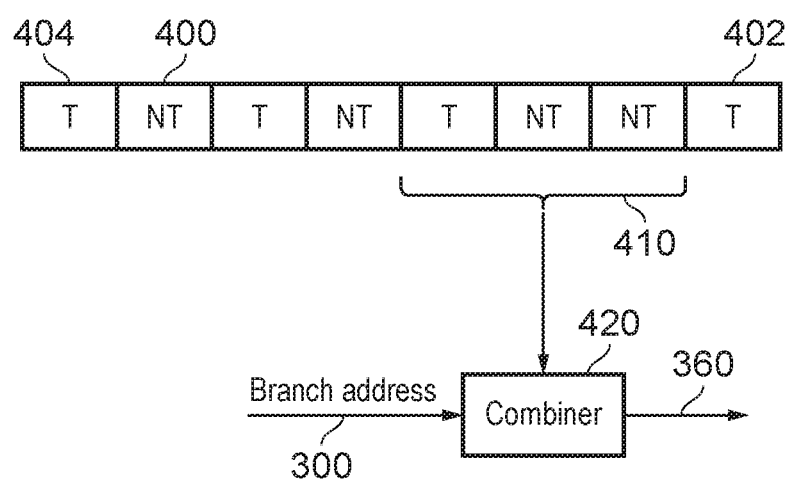
FIG. 4 schematically illustrates the generation of addressing information.

Various possibilities are available for generating the addressing information 360. In an example shown schematically in FIG. 4, a history register 400 maintains a history of recent outcomes of branch instruction execution, from a most recent outcome 402 to a least recent (in the terms of the size of the history register 400) outcome 404. As a branch instruction is resolved, it outcome is inserted at the most recent outcome position 402 and the other contents of the history register are shuffled towards the least recent outcome position 404. In practical terms, this may be achieved using a circular buffer and moving pointers, but the effect is as described above. In FIG. 4, the historical outcomes are shown as T (taken) or NT (not taken) but these may be stored as respective bit values such as 1, 0.

The history register 400 can be a global history register such that the outcomes stored in the history register 400 relate to all executed branch instructions, or could be a local history register such that the stored branch outcomes related to outcomes of a branch instruction at a particular branch address (PC value). In the current example, the history register 400 is a global history register. A subset 410 of bits of the history register 400, for example at a predetermined position relative to the most recent 402 and the least recent 404 positions in the history register, can be used as an input in the generation of the addressing information 360.

Therefore, in these examples of a local history register, each prediction register entry comprises a plurality of prediction data values, and the prediction circuitry is configured to select one of the prediction data values for use as the prediction data for a given branch instruction according to a permutation of most recent resolutions of whether the branch represented by the given branch instruction is taken or not.

Another possible contribution to the addressing information 360 is the branch address 300, or at least a subset of its bits. One or both of these inputs may be combined by a combiner 420 to generate the addressing information 360. For example, the combiner could include a logical exclusive-or (XOR) function. In other examples, the combiner 420 may include a hashing function.

A hashing function is, in this context, a generic function which maps a data input to a data output. In the context of accessing entries in the PHT, a desirable feature of a suitable hashing function is that relatively similar branch addresses are mapped to relatively disparate entries or locations within the PHT.

Figure 5:
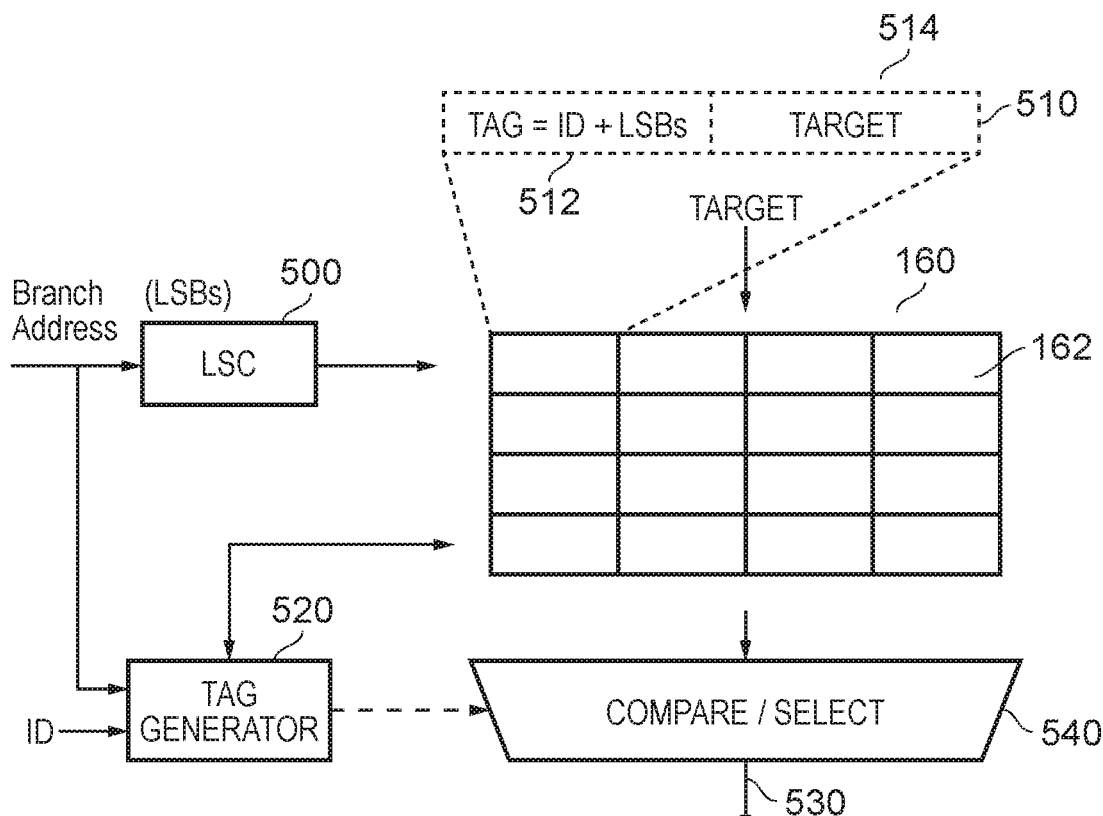
FIGS. 5 and 6 schematically illustrate branch target buffers.

FIG. 5 schematically illustrates aspects of the operation of the BTB 160. The BTB 160 is an n-way associative structure, in this example 4-way associative, in that there are n different entries 162 corresponding to a single location (row as drawn in FIG. 5) in the BTB 160.

The LSBs of the branch address 300 are used to determine a location within the BTB 160, according to a location selection circuitry 500 which applies a hashing function, providing an example in which the location selection circuitry is configured to select the set of one or more memory locations for a data item by applying a hashing function to the attribute of the data item. A hashing function is, in this context, a generic function which maps a data input to a data output. In the context of accessing entries in the PHT, a desirable feature of a suitable hashing function is that relatively similar branch addresses are mapped to relatively disparate entries or locations within the BTB.

Accordingly, a row (as drawn) is selected according to a set of LSBs of the branch address 300 and a BTB entry is written to one of the four (in this example) entries 162 in that row.

An actual entry 510 comprises a tag 512 (generated by a tag generator 520) comprising at least the page identifier (IDE) 330 provided by the region table 310 and the target address 514 relating to the branch in question. This information is stored when a branch instruction (or at least a taken branch instruction) is encountered in execution of the programme code by the processing element 110.

Therefore, the BTB 160 provides an example of memory circuitry providing a plurality of memory locations, and the arrangement of FIG. 5 provides an example of circuitry comprising the memory circuitry (BTB) 160, location selection circuitry such as the location selection circuitry 500 to select a set of one or more of the memory locations (for example a row as drawn in FIG. 5) by which to access a data item, according to a mapping relationship (such as the hash function implemented by the location selection circuitry 500) between an attribute of the data item (such as for example the LSBs or another set of bits of the branch address) and the set of one or more memory locations.

The location selection circuitry 500 is also configured to initiate an allocation operation for a data item when that data item is to be newly stored by the memory circuitry and the selected set of one or more of the memory locations at already occupied by one or more of the data items. In other words, if a row pointed to by a hash of the current branch address LSBs is already full an allocation operation is performed. The allocation operation comprises an operation to replace at least a subset of the one or more other (already stored) data items from that set of one or more memory locations by the newly stored data item.

The fact that the hashing function incremented by the location selection circuitry 500 maps a set of LSB is onto a (potentially smaller) range of locations or rows in the BTB 160 implies that so-called aliasing can occur such that two or more different branch addresses happen to be mapped to the same location in the BTB 160. Because the BTB is n-way associative, it can store more than one entry at the same hashed location (so that the mapping of the attribute is to two or more memory entries), but in general terms the occurrence of aliasing can mean that there is a significant turnover of information at a particular hashed location in that there is a frequent eviction and replacement of existing stored information by the two or more branch addresses competing for the same hashed location. This situation will be referred to below as a data access conflict in which a group of two or more data items having different respective attributes are mapped by the mapping relationship (for example the hashing function) to the same set of one more memory locations (for example in the BTB 160). Note that such data access conflicts may mean that many branch addresses are mapped or allocated to the same location or index in the BTB 160 but can also lead to some indices or locations (rows as drawn) in the BTB 160 remaining unused, which is potentially wasteful of storage space in the BTB 160.

At a read operation from the BTB 160, the same hash function is applied by the location selection circuitry 500 and a tag regenerated by the tag generator 520. The BTB entries in the location (row as drawn) of the BTB 160 corresponding to the hashed address are read out and an entry for which the stored tag 512 matches the tag newly regenerated by the tag generator 520 is selected for output 530 by a comparator and selector 540.

Figure 6:
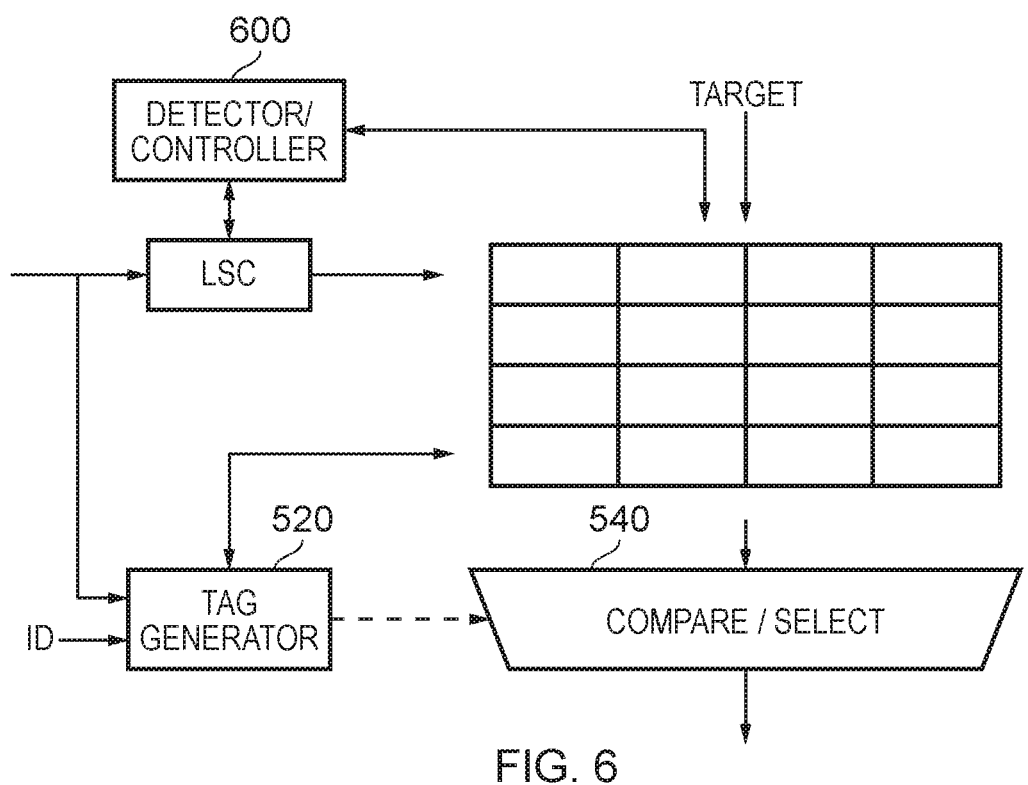

FIG. 6 schematically illustrates an arrangement which can at least partially alleviate this issue of competition for BTB locations due to aliasing.

In FIG. 6, detector/controller circuitry 600 is configured to detect a data access conflict of the type described above and in example embodiments to control the operation of the location selection circuitry so as to vary the mapping relationship applicable to the attribute of at least one data item of the group of two or more data items involved in the data access conflict, in response to the detection of a data access conflict.

Figure 7:
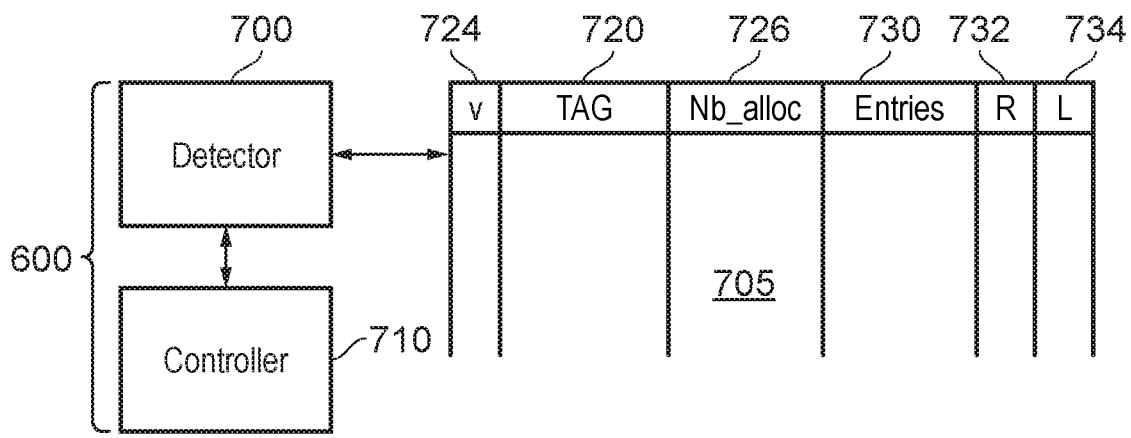
FIG. 7 schematically illustrates aliasing monitoring.

Operation of the detector/controller circuitry 600 will be discussed further with reference to FIG. 7, which shows the detector/controller circuitry 600 comprising a detector 700 and a control at 710 configured to interact with an aliasing monitor data table 705 (for example, stored by the detector 700) as drawn to the right hand side of FIG. 7.

The aliasing monitor data table stores the tag field 720, a validity flag 724, a value "Nb_alloc" 726 indicating the detected number of allocations into that BTB index, a value "Entries" 730 indicating the number of branches in a current block of program code trying to be allocated, a remap_valid flag (R) 732 and a remap_lock value 734. the remap_lock value is used as discussed below by the detector circuitry to inhibit a further change to the indicator data associated with the data item for which a data access conflict has been detected until at least a predetermined number of subsequent allocation operations have been performed by the location selection circuitry.

Allocation

At allocation, for each BTB allocation that misses (which is to say, the entry is not already in the BTB) the predict block address (in this context, the branch address 300) is allocated into the aliasing monitor table 705. A victim entry is selected to be replaced in the BTB 160. In case the victim entry is remap-locked (the value 734 is greater than zero) then the value 734 is decremented. This allows remapped entries to be freed at a point in the future and avoids rapid changes of mapping and remapping.

Update

For an update, the value 726 is incremented each time an allocation into the BTB hits at that index. The value 730 is updated to indicate how many branches in a current block of program code (having a common portion of the branch address) are trying to be allocated. This information is used to detect the situation of one block of program code having several active branches all competing sellers to exceed the associativity of the BTB.

When the value 726 exceeds a threshold such as 16, the remap_valid flag 732 is set and the remap_lock value 734 is set to a predetermined constant (for example, 64 or 128). A remapping operation to be discussed below is then established, providing an example of the detector circuitry being configured to detect a data access conflict in response to the location selection circuitry performing at least a predetermined number of successive allocation operations for a given data item. The remap_valid flag remains set until the remap_lock value has reached zero.

In some examples, the detector circuitry is configured to change the state of indicator data associated with a data item selected from the list consisting of: (i) a data item for which the location selection circuitry has varied the mapping relationship; and (ii) a data item detected as part of a group of one or more data items for which a data access conflict has been detected. In other words, the remap_valid flag could be changed for the remapped data item or for the non-remapped data items.

Lookup

At look up, the aliasing monitor data table is consulted and, if the remap_valid flag 732 is set, a different mapping can be used for access to the BTB for that entry.

Figure 8:
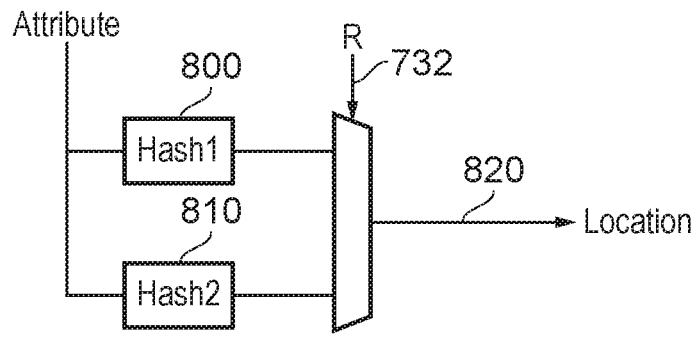
FIGS. 8, 9A and 9B schematically illustrate the variation of a mapping function.

FIG. 8 schematically illustrates an arrangement using multiple different hash functions 800, 810, such that the attribute of the data item (for example, the portion of the branch address) is processed by both hash functions and the remap_valid flag 732 used to select the one of the hashed values to specify the location 822 access that data item in the BTB 160.

Figure 9A:
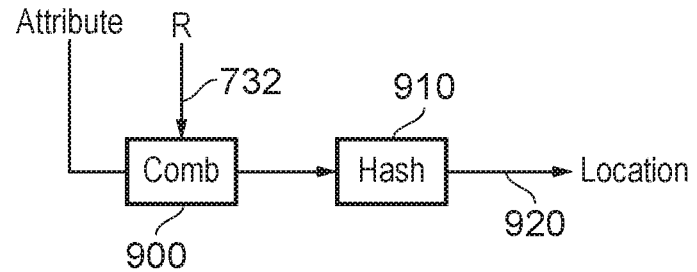

In another example shown in FIG. 9A, the remap_valid flag 732 is combined with the attribute to be hashed by combining logic 900 such as logic providing an XOR operation or by concatenating logic, and the resulting combination is provided to the hash function 910 to generate a location 920.

Figure 9B:
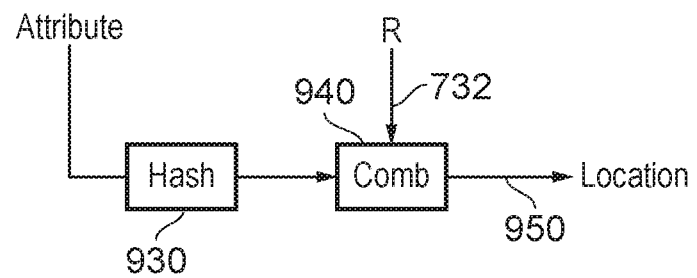

In a further example of FIG. 9B, the attributes to be hashed is provided to the hash function 930 and the hashed output combined by combining logic 940 with the remap_valid flag 732 to generate the required location 950.

FIGS. 8, 9A and 9B therefore provide examples in which the location selection circuitry is configured to vary the mapping relationship applicable to the attribute of at least the given data item.

Figure 10:
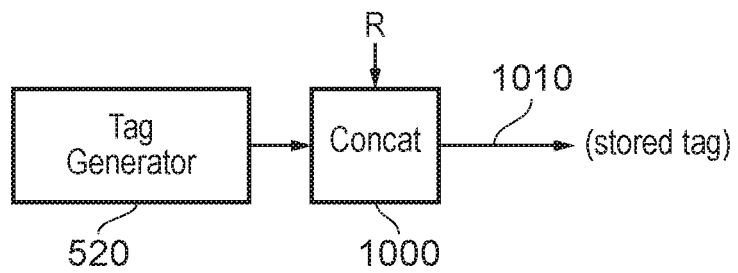
FIG. 10 schematically illustrates tag generation.

In some examples such as that shown in FIG. 10, the tag generator 520 can be modified by the provision of concatenating logic 1002 concatenate the remap_valid flag with the tag as generated by the tag generator 524 storage in the field 512 as a stored tag 1010.

Figure 11:
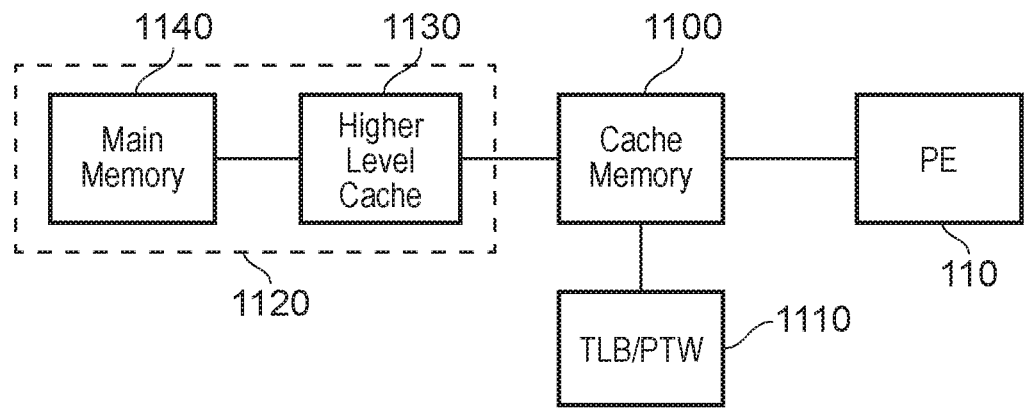
FIG. 11 schematically illustrates a data processor.

The techniques described above have related to branch target buffers, but are also fully applicable to cache memories such as a cache memory 1100 of FIG. 11 as an example of memory circuitry providing a plurality of memory locations, and in particular an n-way set associative cache memory so that the attribute (for example, an address or part of an address of a data item to be cached) is mapped to n memory locations. For example, the cache memory 1100 could provide an example of the cache memory 130 of FIG. 1 so as to provide a low-latency storage for access by the processing element 110, possibly making use of address translation by a translation lookaside buffer/page table walk translation circuitry 1110. The cache memory 1100 can be in communication with higher-level memory 1120 possibly including a higher level cache memory 1130 and/or a main memory 1140. Accordingly, FIG. 11 provides an example of a cache memory 1100 comprising circuitry as defined above, in which: the data items represent versions of the contents of a higher level memory at a respective memory address; and the attribute for a data item is dependent at least in part on the memory address of that data item.

Figure 12:
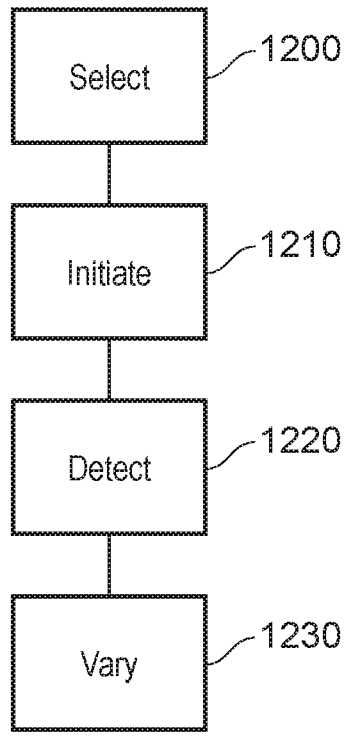
FIG. 12 is a schematic flowchart illustrating a method.

FIG. 12 is a schematic flowchart illustrating a method comprising:

selecting (at a step 1200), from a plurality of memory locations, a set of one or more of the memory locations by which to access a data item according to a mapping relationship between an attribute of the data item and the set of one or more memory locations;

initiating (at a step 1210) an allocation operation for a data item when that data item is to be newly stored by the memory circuitry and the selected set of one or more of the memory locations are already occupied by one or more other data items, the allocation operation comprising an operation to replace at least a subset of the one or more other data items from the set of one or more memory locations by the newly stored data item;

detecting (at a step 1220) a data access conflict in which a group of two or more data items having different respective attributes are mapped by the mapping relationship to the same set of one or more memory locations; and varying (at a step 1230) the mapping relationship applicable to the attribute of at least one data item of the group of two or more data items in response to a detection of a data access conflict.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Circuitry comprising:

memory circuitry providing a plurality of memory locations;

location selection circuitry to select a set of two or more of the memory locations by which to access a data item according to a mapping relationship between an attribute of the data item and the set of two or more memory locations;

the location selection circuitry being configured to initiate an allocation operation for a data item when that data item is to be newly stored by the memory circuitry and the selected set of two or more of the memory locations are already occupied by one or more other data items, the allocation operation comprising an operation to replace at least a subset of the one or more other data items from the set of two or more memory locations by the newly stored data item; and detector circuitry, comprising a detector and controller configured to interact with an aliasing monitor data table, to detect a data access conflict in which a group of two or more data items having different respective attributes are mapped by the mapping relationship to the same set of two or more memory locations;

the location selection circuitry being configured to vary the mapping relationship applicable to the attribute of at least one data item of the group of two or more data items in response to a detection by the detector circuitry of a data access conflict.

2. Circuitry according to claim 1, in which the detector circuitry is configured to detect a data access conflict in response to the location selection circuitry performing at least a predetermined number of successive allocation operations for a given data item.

3. Circuitry according to claim 2, in which the location selection circuitry is configured to vary the mapping relationship applicable to the attribute of at least the given data item.

4. Circuitry according to claim 1, in which the detector circuitry is configured to change the state of indicator data associated with a data item selected from the list consisting of:
   (i) a data item for which the location selection circuitry has varied the mapping relationship; and
   (ii) a data item detected as part of a group of one or more data items for which a data access conflict has been detected.

5. Circuitry according to claim 4, in which the location selection circuitry is configured to select the set of two or more memory locations for a data item by applying a hashing function to the attribute of the data item.

6. Circuitry according to claim 5, in which the location selection circuitry is configured to apply the hashing function to a combination of the attribute and the indicator data.

7. Circuitry according to claim 4, in which the detector circuitry is configured to inhibit a further change to the indicator data associated with the data item for which a data access conflict has been detected until at least a predetermined number of subsequent allocation operations have been performed by the location selection circuitry.

8. Circuitry according to claim 1, in which the set of memory locations comprises two or more memory locations.

9. A cache memory comprising circuitry according to claim 1; in which:
   the data items represent versions of the contents of a higher level memory at a respective memory address; and
   the attribute for a data item is dependent at least in part on the memory address of that data item.

10. A data processor comprising:
    a processing element to execute data processing instructions;
    fetch circuitry to fetch instructions for execution, defined by entries in a fetch queue; and
    prediction circuitry to generate entries for the fetch queue defining one or more next data processing instructions to be fetched;
    the prediction circuitry comprising circuitry according to claim 1, the circuitry providing branch target storage to store one or more data items each comprising at least part of a program counter value and information defining a respective branch target address for a previously taken branch instruction, in which the attribute of a data item is dependent at least upon the program counter value.

11. A method comprising:
    selecting, from a plurality of memory locations, a set of two or more of the memory locations by which to access a data item according to a mapping relationship between an attribute of the data item and the set of two or more memory locations;
    initiating an allocation operation for a data item when that data item is to be newly stored by the memory circuitry and the selected set of two or more of the memory locations are already occupied by one or more other data items, the allocation operation comprising an operation to replace at least a subset of the one or more other data items from the set of two or more memory locations by the newly stored data item;
    detecting a data access conflict in which a group of two or more data items having different respective attributes are mapped by the mapping relationship to the same set of two or more memory locations, the detecting comprising controlling interaction with an aliasing monitor data table; and
    varying the mapping relationship applicable to the attribute of at least one data item of the group of two or more data items in response to a detection of a data access conflict.

* * * * *